Nov. 18, 1947. J. M. STEP 2,431,000
TRANSPORTING VEHICLE WITH CONVEYOR FOR UNLOADING
Filed Dec. 19, 1945 2 Sheets-Sheet 2
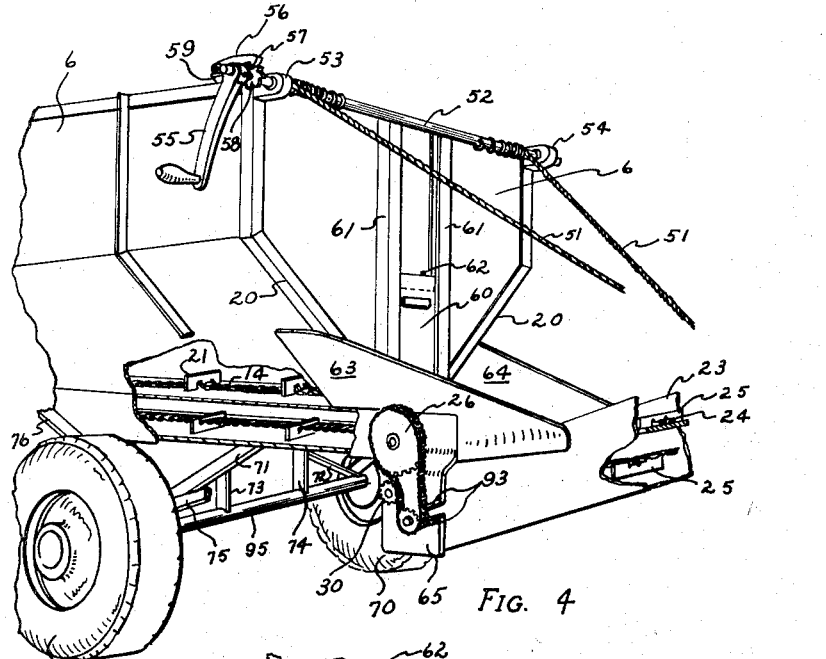
FIG. 4
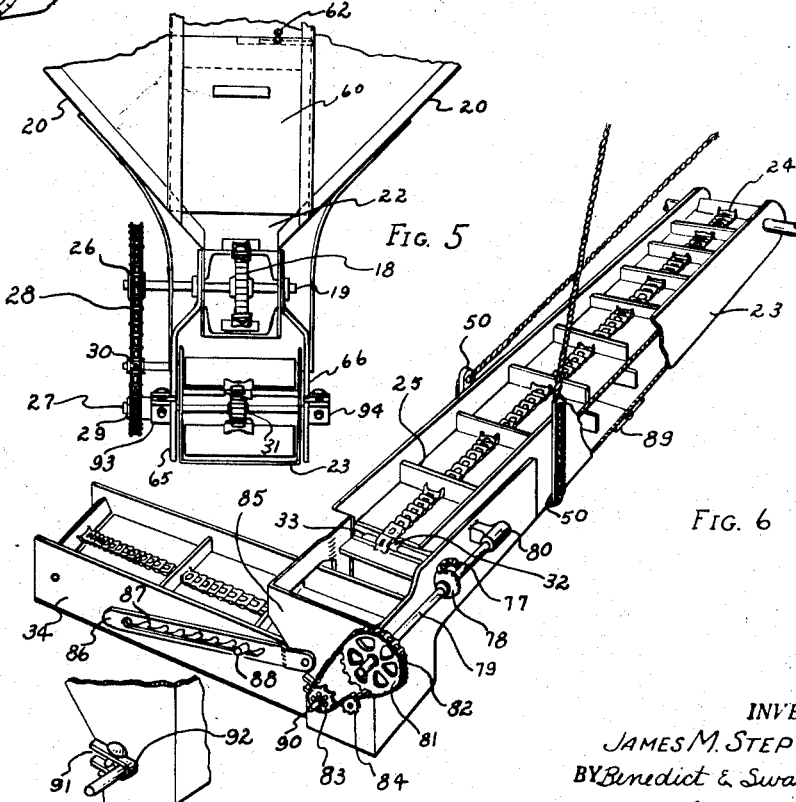
FIG. 5
FIG. 6
FIG. 7
INVENTOR.
JAMES M. STEP
BY Benedict & Swartwood
ATTORNEYS Patented Nov. 18, 1947

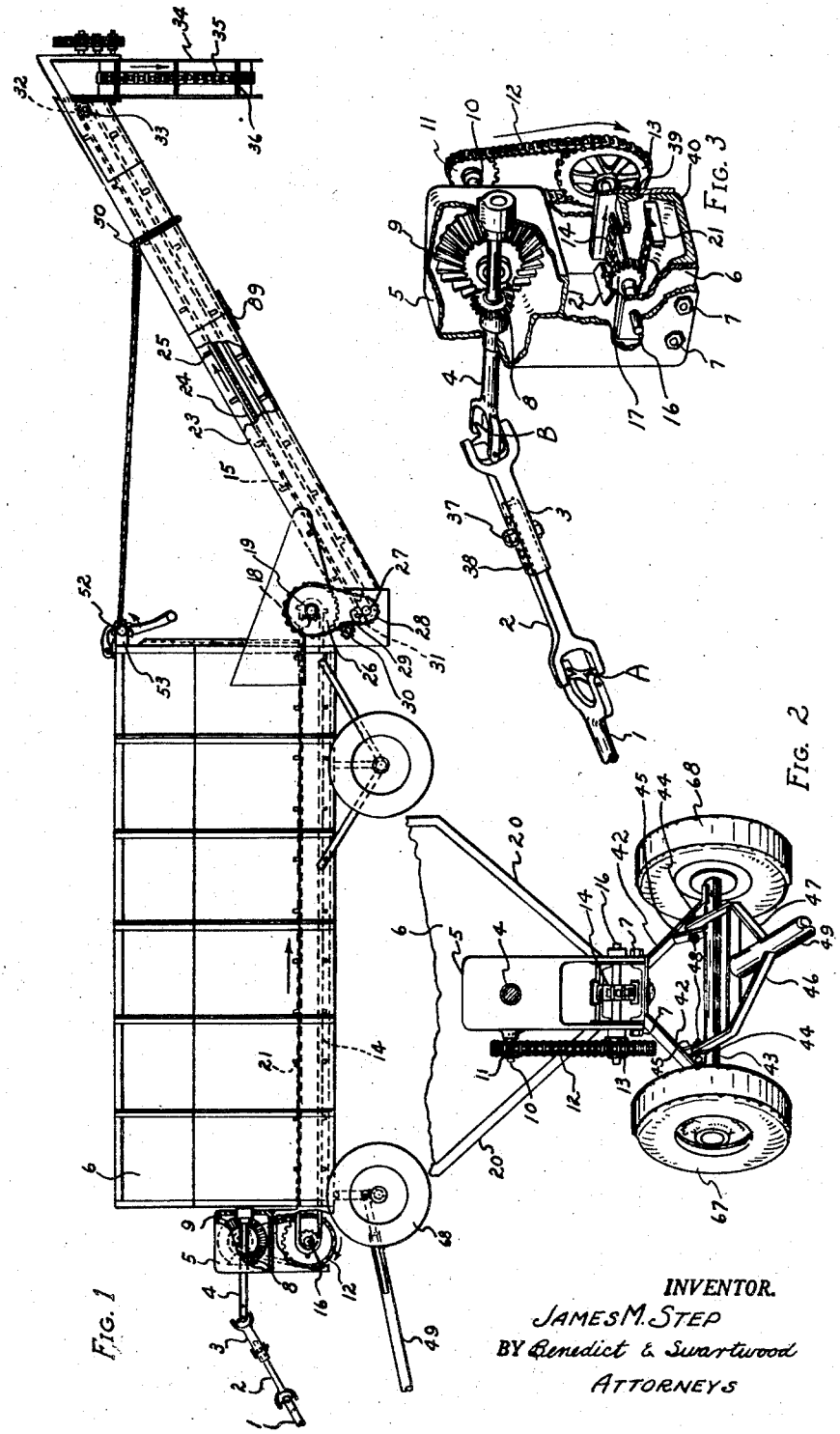

2,431,000

UNITED STATES PATENT OFFICE 2,431,000

TRANSPORTING VEHICLE WITH CONVEYOR FOR UNLOADING

James M. Step, Paris, Ill.

Application December 19, 1945, Serial No. 635,923

7 Claims. (Cl. 214—83)

My invention relates to a new and improved vehicle with conveying means for the transportation and the automatic unloading of material such as grain, coal, gravel, sand and the like.

A main object of my invention is to provide a novel construction of a vehicle which is self-unloading by means of the power take off of the means used for transporting the vehicle from one place to another.

Another important object of my invention is to provide a harvest vehicle of the type described herein which includes a unique arrangement for driving the unloading mechanism.

A particular object of my invention is to provide a harvest wagon which can be pulled by a tractor directly to the harvest machine, receive the harvest grain, then pulled to the storage bin where the grain is unloaded without disconnecting the tractor and with no hand shoveling.

My invention is applicable to either tractor drawn wagon in which the unloading mechanism is driven by the power take off of the tractor or to a truck in which the unloading mechanism is driven by the power take off of the truck. The means for unloading is the same for both and only differs in the specific means of connecting the power take off to the unloading mechanism.

My invention is particularly directed to a grain harvest wagon for gathering grain from the field and the unloading of the grain by power driven conveyor means to storage bins. The description of the invention is directed towards such use but it is understood that my vehicle and unloader can also be used for transporting and unloading of other materials such as coal, sand, gravel and the like.

Other objects, advantages, uses, and applications of my grain wagon and conveyor will become apparent by referring to the drawings in which Figure 1 shows the side view of the wagon and conveyor, including the gear box mechanism and coupling arrangement.

Figure 2 shows the lower portion of the front end of the grain box, to which the gear box is rigidly attached. The wheels are shown at a slight angle to better illustrate the method by which the wagon is attached to the tractor.

Figure 3 shows in perspective the gear box, the end of the conveyor chain, and arrangement for connecting with the source of power.

Figure 4 shows in perspective the back side view of the grain box with the conveyor chute in position.

Figure 5 is a detailed end view of the lower portion of the rear of the wagon to show the relative position of the gears and the drag chains in the grain box and in the long convèyor chute.

Figure 6 is a detailed perspective of the long conveyor chute and the shorter end chute.

Figure 7 shows in perspective the arrangement by which both the long and short conveyor chutes are quickly and easily mounted.

Referring to Figures 1, 2 and 3; a shaft 1 leading from a tractor take off, or similar source of power, is connected by means of a universal coupling 2 and 3 (Figs. 1 and 3), adjustment of which will be described later in more detail, to a shaft 4 leading to the gear box 5 which is rigidly fastened to an extended portion of the front lower end of the grain box 6 by means of bolts 7. A small bevel gear 8 drives a larger bevel gear 9, which is mounted on a shaft 10 which extends outside the gear box 5 and is geared to a small hob gear 11 from which a chain 12 leads to a larger hob gear 13. The set of bevel gears 8 and 9 and the set of hob gears 11 and 13 are in a ratio of about 1:4 so as to greatly reduce the speed and increase the power of the drag chain 14 in the wagon box so as to more efficiently carry the grain load to the drag chain 15 of the conveyor. The large hob gear 13 is attached to a shaft 16 upon which another small gear 17 is attached. Another gear 18 of the same size is mounted on a shaft 19 (Fig. 1) at the opposite end of the grain box 6, the drag chain 14 moving on these two gears toward the back end of the grain box 6. The flow of grain in the wagon is constantly directed onto the drag chain 14 by virtue of sloping sides 20 (Fig. 2) of the lower portion of the grain box 6. It is preferable to have the sides at an angle of at least 45° with the horizontal to obtain better feeding. At regular intervals small rectangular lugs 21 are attached to the drag chain 14 to facilitate the movement of grain toward the opening 22, which is best shown in Figure 5, in the rear end of the grain box 6 where it is dropped into a chute 23 which contains a similar drag chain 24. The grain is carried by rectangular lugs 25, (best shown in Fig. 6) larger in size than the lugs 21 attached to the grain box drag chain 14. The speed of the grain in the chute 23 is greatly increased by a large gear 26 which is attached to a shaft 27 and drives, by means of a chain 28, a smaller gear 29. This set of gears 26 and 29 are also in about a 1:4 ratio. Such increase in speed of the grain in the chute or conveyor 23 greatly facilitates the unloading of the grain from the wagon.

The small gear 18 is attached to shaft 19 and drives the large gear 26. Any slack in the drive chain 28 is taken up by the idler 30. (Figs. 1 and 4). The gear 29 attached to the shaft 27 drives a gear 31 which is a little smaller in size. Another gear 32 of the same size is mounted on a shaft 33 at the opposite end of the conveyor chute 23, and the drag chain 24 moves on these two gears 31 and 32 carrying the grain toward the end of the chute 23. There the grain is dropped in a shorter chute 34 and carried by a chain 35 to which lugs 36 have been attached to a storage bin, elevator or other container.

Referring to Figure 3, the smaller solid square portion of the universal coupling 2 fits into a larger part of the coupling 3 which is also square in shape. These two parts are fastened together by means of a bolt 37 which drops into an opening 38 in the two parts. By means of a series of such openings 38 the length of the coupling can be increased or decreased as desired with a minimum of time and labor involved. Two pieces of channel 39 and 40 form a box shaped unit extending into the grain box 6 and beyond the back end of the box. The top half of the drag chain 14 moves along the outside surface of the top channel 39 and the bottom half moves inside the enclosed unit formed by the pieces of channel 39 and 40. In Figure 3 the top channel has been cut away so as to show the gear 17 in position. The top channel 39 is shorter than the lower channel 40 to provide space for the gear 17 and shaft 16.

Referring to Figure 2, the two front wheels 67 and 68 are mounted in such a manner that they require no more space than that necessary to accommodate the width of the grain box 6, even when they are turned at the maximum angle. This is accomplished by the support 42 which is fastened rigidly to and angles upwardly from the axle 43, just behind each wheel, and extends up to the bottom of the channel iron 40. This support 42 is fastened so as to allow this entire support to turn with the wheels 67 and 68 as one complete unit.

On each side and extending up between the axle 43 and the angled support 42 are two small supports 44 and 45 spaced far enough apart to allow supporting bars 46 and 47 to be slipped into position between them. Supporting bars 46 and 47 are held in place with a bolt 48 which extends through the three supports 44, 45 and 47 on each end of the axle 43. This enables one to connect the grain container 6 very quickly and easily with the tractor tongue 49.

Referring to Figures 1, 4 and 6, two narrow metal braces are attached to each side of the chute 23. One end of a cable 51 is connected to a heavy rod 52 which is journaled to brackets 53 and 54 which are fastened to each side of the back end of the grain box 6. The cable is then crossed over to the opposite side of the chute 23 where it passes under and up the side of the chute 23, through the brace and across to be fastened on the opposite side to the rod 52. A crank 55 is used to wind the cable 51 on the rod 52 thereby raising the chute to the desired angle, being fastened in position by means of a pin 56 with a hooked end 57 which drops down and catches on a ratchet 58 which is fastened on and turns with the bar 52. The pin 56 is hinged to a plate 59 so that the pin 56 can be lifted up, thereby allowing the chute 23 to be raised or lowered.

A small door 60 which is best shown in Figures 4 and 5 is held in place against the rear end of the grain box 6 by two pieces of angle iron 61 and 65 which form a groove in which the door 60 can be moved up or down. It is apparent that in this manner the size of the opening 22 can be controlled so as to regulate the flow of grain passing from the grain box 6 to the conveyor chute. The door 60 is fastened, by means of a conventional slide catch 62, in the desired position. Side plates 63 and 64 are fastened rigidly to the angled side of the grain box 6 and extend down to the sides of the conveyor chute 23, thus preventing any of the grain from escaping as it moves onto the conveyor chain 24. Two heavy plates 65 and 66 are attached on each side of the end of the grain box 6; the plate 65 providing a rigid mounting plate for the large gear 26, the small gear 29, and the idler 30. The conveyor chute 23 is mounted between plates 65 and 66 and is mounted in the same manner as the shorter conveyor chute 34 is mounted to chute 23 as will be described later in more detail.

Referring to Figure 4, the rear wheels 69 and 70 are attached to the axle 95 which is held in place by supports 71 and 72 which angle up toward and are fastened to the bottom center portion of the grain box 6. These supports 71 and 72 are further strengthened and the axle 95 held more securely by supports 73 and 74 which are welded in a vertical position extending from the axle 95 up to the supports 71 and 72. Additional braces 75 and 76 are attached to the axle just in back of the wheel and are welded to the angled side walls 20 of the grain box 6.

Referring to Figure 6, a gear 32 is attached to a shaft 33 which is journalled in the side of chute 23 and extends through the opposite side where a bevel gear 77 is attached. As the conveyor chain 24 moves on the gear 32 the gear 77 is turned and it drives a gear 78 which is attached to a shaft 79, the shaft being held in position by a bracket 80. Shaft 79 turns a large gear 81 from which a chain 82 leads to a smaller gear 83. An idler 84 is provided to eliminate any slack in the chain. The large gear 81 and the small gear 83 are in a 4:1 ratio, the purpose being to further increase the speed by which the grain is being moved from the conveyor chute 34 into the storage bin. A more important advantage is that the increased speed of the grain in chute 34 throws the grain far back into the bin thereby avoiding considerable hand shoveling. This is accomplished in part because the increased speed tends to distribute the grain on the elevating conveyor in a thinner layer than exists in chute 23, and because of the increased speed of the conveyor. The faster moving conveyor in chute 34 operating on the thinner layer of material tends to increase the throw of the grain so that it travels a greater distance than would be the case if both conveyors operated at the same speed. In this way the tedious, tiresome work of shoveling the grain back into the bin can be eliminated or minimized to a large extent. An additional end section 85 is welded to the sides of the conveyor chute to provide a strong support for mounting the bracket 80, the shaft 79, and the gear 83. The catch 86, which is used in fastening the short chute 34 at the desired angle by means of notches 87 into which a short peg 88 slips, is also mounted on the chute end section 85. A hinge 89 is fastened to the bottom of the chute 23 which is hinged to it at this point, enabling the operator to fold back the end of the chute 23 after the end chute 34 has been removed and when the conveyor chute 23 is not in use, thus reducing the amount of space necessary to house or store it. A shaft 90 is journalled in the side plates of the chute 34 and slips down into a slot 91 cut into the chute end section 85. This is then locked into position by a bolt which slides into a hole in the metal V-shaped member 92 which has been welded around the slot 91. This method of mounting the shorter conveyor chute 34 with the longer conveyor chute 23 is quite easily and quickly accomplished. This same method is used in mounting the long conveyor chute 23 between the plates 65 and 66 to which corresponding metal extensions 93 and 94 have been attached and which are shown in Figure 5.

Thus I have provided many features in my grain wagon and elevator which are not found in any presently on the market:

1. The universal couplings A and B and the freedom of turning the front wheels 67 and 68 under the grain box permits the tractor to back the wagon in at any angle and still permit the shaft 1 to be turned by the power take off of the tractor. In those presently built this cannot be done and the tractor is first used to back the wagon into position and is then uncoupled and driven into position for supplying the power.

2. The steeper angle of the sides 20 permits rapid unloading of the wagon box.

3. The ratio of the gears described gives maximum power in the wagon box where needed and maximum speed in the conveyor.

4. The angled chute 34 permits the unloading of the grain into any place the wagon can be backed into.

5. The increased speed of the grain in the chute 34 minimizes the amount of hand shoveling required since it throws the grain far back into the storage bin.

6. The method of coupling the conveyors reduces the time required for assembling the entire apparatus.

While I have described several modifications of my drawings, it is understood that my invention is not limited to such modifications since any other device within the scope of my invention may be used. My invention is only limited by the following claims.

I claim as my invention:

1. A vehicle of the class described comprising a wheel chassis, a container box mounted on said chassis for containing material to be transported and unloaded, a conveyor chain in the center and bottom of said box and running throughout the length of the box, means for driving said conveyor chain by the power take off of a traction means for the vehicle powered by an internal combustion engine, the lower portion of the box having its sides sloping toward said conveyor chain, said chain passing around a pair of gears located at opposite ends of the box with one of said gears being driven by said power take off means through a plurality of chain-driven speed reducing gears, said chain adapted and arranged to move the material in the box from the front to the rear, an adjustable door and doorway in the rear through which the material spills as moved by said chain, a first conveyor chute having a second conveyor chain, said chute adapted and arranged to receive the material as it spills through said doorway, said last mentioned conveyor chain adapted and arranged to lift the material upwardly in the chute, said last mentioned chain passed around gears located on opposite ends of the chute with the gear at the lower end operatively engaged with a series of chain-driven speed multiplying gears so as to be driven by one of the gears around which the chain in the box passes, in such a manner that the material passes at a faster rate up the chute than it does in travelling from the front of the box to the rear, a second and smaller chute at the upper end of the first chute adapted and arranged to receive the material spilling from the first chute, said second chute also having a conveyor chain driven by speed multiplying gears operatively associated with the chain and gears in the first chute and adapted such as to discharge the material from the second chute at a rate of speed greater than the speed with which the material passed upwardly in the first chute, said first chute pivotally mounted to be raised and lowered at any angle, said second chute pivotally and adjustably attached to the first chute so as to be raised and lowered at any vertical angle and said second chute attached to the first chute at about a right angle with the first chute.

2. A harvest wagon of the class described comprising a wheel chassis, a grain box mounted on said chassis, the front of wheels of said chassis mounted so as to be turned through an angle of at least 180°, a tongue attached to said front wheels for connecting to a tractor to enable the entire apparatus to be drawn by the tractor, a universal connection to the power take off of the tractor, a conveyor chain in the center and bottom of said grain box and running throughout the length of the grain box, the lower portion of the grain box having its sides sloping toward said conveyor chain, said chain passing around a pair of gears located at opposite ends of the grain box with the gears at the front or tractor end driven by said power take off through said universal connection and through a plurality of chain-driven speed reducing gears, said chain adapted and arranged to move grain in the box from the front to the rear, an adjustable door and doorway in the rear through which the grain spills as moved by said chain, a first conveyor chute having a second conveyor chain, said chute adapted and arranged to receive the grain as it spills from said doorway, said last mentioned conveyor chain adapted and arranged to lift the grain upwardly in the chute, said last mentioned chain passed around gears located on opposite ends of the chute with the gear at the lower end operatively engaged with a series of chain-driven speed multiplying gears so as to be driven by the gears at the end of the box around which the chain in the box passes in such a manner that the grain passes at a faster rate up the chute than it does in travelling from the front of the box to the rear, a second and smaller chute at the upper end of the first chute adapted and arranged to receive the grain spilling from the first chute, said second chute also having a conveyor chain driven by speed multiplying gears operatively associated with the chain and gears in the first chute and adapted such as to discharge the grain from the second chute at a rate of speed greater than the speed with which the grain passed upwardly in the first chute, said first chute pivotally mounted to be raised and lowered at any vertical angle, said second chute pivotally mounted and adjustably attached to the first chute so as to be raised and lowered at any vertical angle and said second chute attached to the first chute at about a right angle with the first chute.

3. A self-unloading wheeled vehicle comprising an elongated material bed with inwardly sloping sides, a channel running lengthwise of said bed, the upper portion of said channel forming the floor of the bed, universal power transmitting means operatively attachable to the power takeoff of a traction means for said vehicle, a speed reducer operatively associated with said universal; a drive shaft operatively associated with said speed reducer, said drive shaft having a driving gear attached thereto, said shaft and gear being mounted at the front of said bed and said channel; a conveyor belt driven rearwardly of said bed by said driving gear along the top of said channel to engage a second gear mounted on a second shaft external of and at the rear of said bed, said conveyor belt returning forwardly through said channel and around the first-mentioned gear, an adjustable door and doorway in the rear of said bed, a hopper located below said doorway, a third driving gear attached to said second shaft at the rear of said bed and passing through said hopper, said third driving gear forming a part of a speed multiplying means, a conveyor chute pivotally mounted for vertical swing on the second shaft, said chute having mounted therein a second conveyor belt driven by said speed multiplying means, means for raising and lowering said material conveying chute at any angle from the horizontal to the vertical, said material conveying chute having a hinge intermediate its length by means of which it can be folded for transportation to reduce the length of said chute when in non-operating position.

4. A self-unloading material carrying vehicle comprising a wheeled chassis, an elongated box having side walls tapering inwardly throughout its length; a conveyor channel extending longitudinally of said box, the top of said channel forming the bottom of said box, a universal power transmitting mechanism attachable to the power takeoff of a traction means for said vehicle, said universal operatively associated with speed reducing means mounted on said box, a drive shaft operatively connected with said speed reducing means, means on said shaft for supporting and driving a conveyor belt, a conveyor belt for moving material from the front toward the back of said box, one flight of said belt moving rearwardly over the top of said channel and the other flight moving forwardly beneath said channel out of contact with the material to be moved; a second drive shaft mounted exterior of the bed of said vehicle and rearwardly thereof, said second drive shaft having a sprocket driven by said conveyor belt attached thereto, speed multiplying gearing operatively associated with said second shaft to drive an elevating conveyor, an adjustable door and doorway in the rear of said box for permitting material to be moved therethrough by the first-mentioned conveyor belt, a hopper attached below said door to the rear of said box to receive material moved through the doorway by said conveyor belt; a third drive shaft mounted in said hopper operatively associated with and driven by said speed multiplying means; an elevating conveyor belt operatively associated with said drive shaft and operating in a first chute, said chute being mounted for vertical pivotal movement on said third drive shaft, a second chute mounted at an angle to and at the end of said first chute, a conveyor belt in said second chute, speed multiplying means driven by the conveyor belt of said first chute, said speed multiplying means driving the conveyor belt in said second chute, said second chute being pivotally mounted for vertical movement at an angle to said first chute.

5. In a tractor-drawn, self-unloading harvest wagon, a universal power transmitting means attachable to the power takeoff of said tractor, speed reducing gearing driven by said universal means, means for mounting said gearing on the front end of said wagon, means for mounting a countershaft in operative engagement with said speed reducing means, means attached to said countershaft for guiding and transmitting movement to an endless conveyor belt passing horizontally lengthwise along the bottom of the box of said wagon; a power transmitting countershaft mounted on the rear of said wagon, means attached to the last named countershaft for guiding said conveyor belt and transmitting the power supplied by the movement of said belt to a speed multiplying gearing operatively attached to said countershaft; an adjustable door and doorway in the rear of said wagon mounted to permit movement of said conveyor belt therethrough and adjustable to permit an increase or decrease of amount of material moved by said belt therethrough; a material receiving hopper mounted below said door to receive material passing therethrough, said hopper including means for mounting a third countershaft and gears transmitting power to a second material-moving conveyor, said conveyor comprising a chute and an endless conveyor belt for moving material from said hopper away from said wagon, said chute being pivotally mounted for vertical movement on said hopper; means for raising or lowering said chute including means for retaining said chute at any desired angle; a second hopper attached to the end of said material-moving conveyor remote from said vehicle; a third conveyor chute mounted at an angle to the first-mentioned chute and comprising an endless conveyor belt mounted therein for moving material from the second hopper into a bin, said last-mentioned conveyor belt being driven by power transmitted by said second-mentioned conveyor belt; speed multiplying means for driving said last-mentioned conveyor belt, said speed multiplying means being operatively engaged with a countershaft driven by the second conveyor means; said last-mentioned conveyor means being pivotally mounted for vertical movement at an angle to the first-mentioned conveyor, and means for holding said last-mentioned conveyor means at any desired vertical angle relative to the second-mentioned conveyor means.

6. In a tractor-drawn, self-unloading harvest wagon, a universal power transmitting means attachable to the power takeoff of said tractor, speed reducing gearing driven by said universal means, means for mounting said gearing on the front end of said wagon, means for mounting a counter shaft in operative engagement with said speed reducing means, means attached to said counter shaft for guiding and transmitting movement to an endless conveyor belt passing horizontally lengthwise along the bottom of the box of said wagon; a power transmitting counter shaft mounted on the rear of said wagon, means attached to the last named counter shaft for guiding said conveyor belt and transmitting the power supplied by the movement of said belt to a speed multiplying gearing operatively attached to said counter shaft and mountable on the rear of said wagon; an adjustable door and doorway in the rear of said wagon mounted to permit movement of said conveyor belt therethrough and adjustable to permit an increase or decrease of amount of material moved by said belt, material handling means detachably mounted below said door to receive material passing therethrough, said material handling means being operatively connected with and driven by said speed multiplying means so as to move material received thereby at a higher speed than it is handled by said unloading conveyor thereby to furnish a throwing impetus to the material received by said material handling means.

7. A device mountable on a material carrying vehicle which comprises a channel member mountable lengthwise of the bed of said vehicle, the upper portion of said channel member forming a material supporting floor in said bed, universal power transmitting means operatively attachable to the power take-off of a traction means for said vehicle, a speed reducer operatively associated with said universal, means for mounting said speed reducer on the front end of the box of said vehicle, a counter shaft and means for mounting said countershaft in operative engagement with said speed reducing means, means attached to said counter shaft for transmitting movement to an unloading conveyor passing horizontally lengthwise along the bottom of the box of said vehicle, a second power transmitting counter shaft, means for mounting said second counter shaft on the rear of said vehicle, means attached to said second counter shaft for transmitting the power supplied by the movement of said conveyor to a speed multiplying gearing operatively attached to said counter shaft and mountable on the rear of said vehicle, an adjustable door and doorway in the rear of said vehicle mounted to permit movement of said conveyor therethrough and adjustable to permit an increase or decrease in amount of material moved by said conveyor, material handling means detachably mounted below said door to receive material passing therethrough, said material handling means being operatively connected with and driven by said speed multiplying means so as to move material received thereby at a higher speed than it is handled by said unloading conveyor thereby to furnish a throwing impetus to the material received by said material handling means.

JAMES M. STEP.

REFERENCES CITED

The following references are of record in the file of this patent:

UNITED STATES PATENTS

| Number | Name | Date |
|---|---|---|
| 1,135,073 | Swarner | Apr. 13, 1915 |
| 2,293,486 | Barrett | Aug. 18, 1942 |
| 2,296,014 | Benzel et al. | Sept. 15, 1942 |
| 2,319,588 | Dreese | May 18, 1943 |
| 2,321,168 | Tognetti | June 8, 1943 |
| 2,340,983 | Pfeiffer et al. | Feb. 8, 1944 |
| 2,347,522 | Stinnett | Apr. 25, 1944 |
| 2,411,056 | Ricketts | Nov. 12, 1946 |
| 2,422,268 | Symonds | June 17, 1947 |